United States Patent [19]

Reiher

[11] Patent Number: 5,200,512

[45] Date of Patent: Apr. 6, 1993

[54] WATER-SOLUBLE AZO COMPOUNDS, HAVING A FIBRE-REACTIVE TRIAZENYLAMINO GROUP

[75] Inventor: Uwe Reiher, Frankfurt am Main, Fed. Rep. of Germany

[73] Assignee: Hoechst AG, Frankfurt am Main, Fed. Rep. of Germany

[21] Appl. No.: 816,299

[22] Filed: Dec. 27, 1991

[30] Foreign Application Priority Data

Dec. 31, 1990 [DE] Fed. Rep. of Germany ....... 4042290

[51] Int. Cl.$^5$ .................... C09B 29/50; C09B 62/085; C09B 62/51; C09B 1/38
[52] U.S. Cl. .................................. 534/635; 534/582; 534/617; 534/631; 534/632; 534/642; 534/737; 534/789; 534/887
[58] Field of Search ............... 534/618, 631, 632, 635, 534/617, 642

[56] References Cited

U.S. PATENT DOCUMENTS

| | | | |
|---|---|---|---|
| 3,925,348 | 12/1975 | Wohlkonig et al. ............ | 534/635 X |
| 4,354,968 | 10/1982 | Kramer et al. ................. | 534/635 X |
| 4,540,776 | 10/1985 | Henk et al. ..................... | 534/635 |
| 4,556,707 | 12/1985 | Henk .............................. | 534/635 |
| 4,946,947 | 8/1990 | Springer et al. ................. | 534/635 |

FOREIGN PATENT DOCUMENTS

| | | | |
|---|---|---|---|
| 49-97821 | 9/1974 | Japan ........................... | 534/635 |
| 56-128381 | 10/1981 | Japan ........................... | 534/635 |
| 2126598 | 3/1984 | United Kingdom ................ | 534/635 |

*Primary Examiner*—Floyd D. Higel
*Attorney, Agent, or Firm*—Connolly & Hutz

[57] ABSTRACT

There are described azo compounds which possess fiber-reactive groups and have valuable dye properties and are capable of dyeing hydroxy- and/or carboxamido-containing materials, in particular fiber materials, such as cellulose fibers and natural and synthetic polyamide such as wool, in strong, fast shades. They conform to the formula (1)

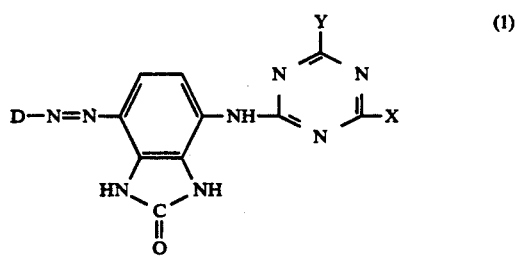

where

D is phenyl or naphthyl which are each substituted, at least one of these substituents being a water-solubilizing group or containing a water-solubilizing group;

Y is fluorine, chlorine or a group of the formula $$-A-R$$

where
A is oxygen or the group NH and
R is hydrogen, cycloalkyl or alkyl which may be interrupted by one or two hetero groups, or is benzyl, sulfomethyl, β-sulfoethyl or cyano;

X is fluorine, chlorine or a group conforming to the formula —NH—B, where
B is a group of the formula (3a), (3b) or (3c)

$$-alk-SO_2-Z \qquad (3a)$$

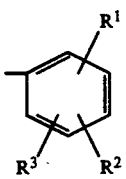

(3b)

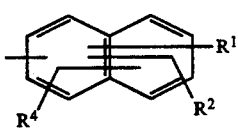

(3c)

where
alk is alkylene which may be interrupted by one or two hetero groups,
Z is a vinyl or an ethyl group which is substituted in the β-position by a substituent which is eliminable by means of alkali to form a vinyl group,
$R^1$ is hydrogen, carboxy, sulfo or a group of the formula —$SO_2$—Z, where Z is as defined above,
$R^2$ is hydrogen, alkyl of from 1 to 4 carbon atoms, alkoxy of from 1 to 4 carbon atoms, chlorine, bromine, carboxy, sulfo or nitro,
$R^3$ is hydrogen, alkyl of from 1 to 4 carbon atoms, alkoxy of from 1 to 4 carbon atoms, chlorine or bromine and
$R^4$ is hydrogen, sulfo or carboxy.

18 Claims, No Drawings

WATER-SOLUBLE AZO COMPOUNDS, HAVING A FIBRE-REACTIVE TRIAZENYLAMINO GROUP

The invention relates to the field of fiber-reactive azo dyes.

The present invention provides novel, water-soluble azo compounds which conform to the formula (1)

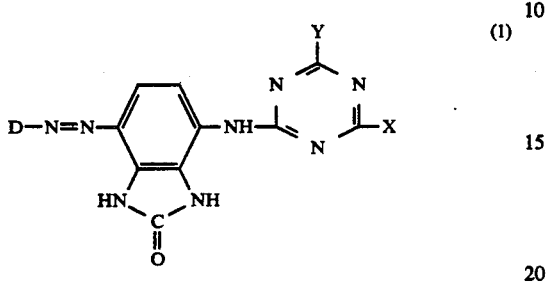

where

D is phenyl or naphthyl which are each substituted, for example by 1, 2 or 3 substituents selected from the group consisting of chlorine, bromine, fluorine, sulfo, carboxy, alkyl of from 1 to 4 carbon atoms, such as ethyl or in particular methyl, alkoxy of from 1 to 4 carbon atoms, such as ethoxy or in particular methoxy, trifluoromethyl, nitro, styryl, nitrostyryl, nitrosulfostyryl, benzothiazol-2-yl, methylbenzothiazol-2-yl, methoxybenzothiazol-2-yl, sulfobenzothiazol-2-yl, methylsulfobenzothiazol-2-yl, sulfamoyl, carbamoyl and alkylsulfonyl of from 1 to 4 carbon atoms, such as methylsulfonyl or ethylsulfonyl, at least one of these substituents being a water-solubilizing group, for example a sulfo or carboxy group, or containing a water-solubilizing group;

Y is fluorine, chlorine or a group of the formula (2)

$$-A-R \qquad (2)$$

where

A is oxygen or the group NH, preferably being NH, and

R is hydrogen, alkyl of from 1 to 10 carbon atoms, preferably of from 1 to 4 carbon atoms, such as ethyl or methyl, or cycloalkyl of from 5 to 8 carbon atoms, such as cyclohexyl, or alkyl of from 2 to 8 carbon atoms which is interrupted by one or two hetero groups, for example groups of the formulae —O—, —NH—, —N(CH$_3$)—, —SO$_2$— or —CO—, or is benzyl, sulfomethyl, β-sulfoethyl or cyano, preferably cyano;

X is fluorine, chlorine or an amino group conforming to the formula —NH—B, where B is a group of the formula (3a), (3b) or (3c)

$$-\text{alk}-SO_2-Z \qquad (3a)$$

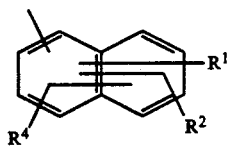

where alk is branched or preferably straight-chain alkylene of from 1 to 4 carbon atoms, preferably n-ethylene or in particular n-propylene, or alkylene of from 2 to 8 carbon atoms which may be interrupted by one or two hetero groups, for example groups of the formulae —O—, —NH—, —N(CH$_3$)— and —SO$_2$—, for example a group of the formula —(CH$_2$)$_2$—O—(CH$_2$)$_2$—, Z is a vinyl or an ethyl group which is substituted in the β-position by a substituent which is eliminable by means of alkali to form a vinyl group, R$^1$ is hydrogen, carboxy, sulfo or a group of the formula —SO$_2$—Z, where Z is as defined above, R$^2$ is hydrogen, alkyl of from 1 to 4 carbon atoms, such as ethyl or in particular methyl, alkoxy of from 1 to 4 carbon atoms, such as ethoxy or in particular methoxy, chlorine, bromine, carboxy, sulfo or nitro, preferably hydrogen, alkyl of from 1 to 4 carbon atoms, alkoxy of from 1 to 4 carbon atoms or sulfo or particularly preferably hydrogen or sulfo, R$^3$ is hydrogen, alkyl of from 1 to 4 carbon atoms, such as ethyl and in particular methyl, alkoxy of from 1 to 4 carbon atoms, such as ethoxy or in particular methoxy, chlorine or bromine, preferably alkoxy of from 1 to 4 carbon atoms or in particular hydrogen, R$^4$ is hydrogen, sulfo or carboxy, preferably sulfo, or is preferably hydrogen if R$^1$ is a group of the formula —SO$_2$—Z.

D is preferably 2,2'-disulfo-4'-nitrostilben-4-yl or 4-chloro-3-methyl-6-sulfophenyl or particularly preferably monosulfophenyl or disulfophenyl, for example 2,4-or 2,5-disulfophenyl, or preferably naphthyl, especially 2-naphthyl, which is substituted by 1, 2 or 3 sulfo groups, for example 4,8-disulfo-2-naphthyl or 3,6,8-trisulfo-2-naphthyl.

Y is preferably fluorine or in particular chlorine or cyanamido.

X is preferably chlorine or a group of the general formula —NH—B where B is a radical of the formula (3a) or (3b).

Substituents which are attached in the β-position of the ethyl group of the radical Z and are alkali-eliminable are for example halogen atoms, such as bromine and chlorine, ester groups of organic carboxylic and sulfonic acids, for example an alkanoyloxy radical of from 2 to 5 carbon atoms, such as acetyloxy, or sulfobenzoyloxy, benzoyloxy, phenylsulfonyloxy or toluylsulfonyloxy, or ester groups of inorganic polybasic acids, for example the acid ester groups of phosphoric acid, of sulfuric acid and of thiosulfuric acid (phosphato or sulfato or thiosulfato groups) and dialkylamino where alkyl is in each case of from 1 to 4 carbon atoms, such as dimethylamino and diethylamino. The radical —SO$_2$—Z is preferably vinyl or in particular β-sulfatoethyl.

Hereinbefore and hereinafter the group names "sulfo", "carboxy", "thiosulfato", "phosphato" and "sulfato" encompass not only the acid form thereof but also the salt form thereof. Accordingly, sulfo groups are groups conforming to the formula —$SO_3M$, carboxy groups are groups conforming to the formula —COOM, thiosulfato groups are groups conforming to the formula —S—$SO_3M$, phosphato groups are groups conforming to the formula —$OPO_3M_2$, and sulfato groups are groups conforming to the formula —O—$SO_3M$, in each of which M is as defined above.

The present invention further provides processes for preparing the azo compounds of the formula (1) according to the present invention, which comprise reacting an amine of the formula (4)

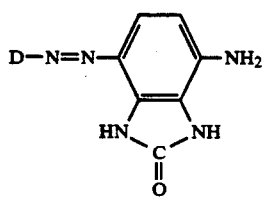

(4)

where D is as defined above, with a compound of the formula Hal-W, where Hal is chlorine or fluorine and W is a radical of the formula (5)

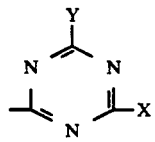

(5)

where X and Y are each as defined above, and if in the formula Hal-W Hal, X and Y are all halogen they are all chlorine or all fluorine,
or reacting a compound of the formula (6)

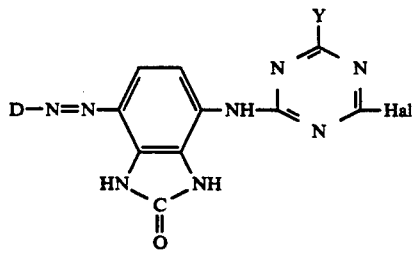

(6)

where D, Y and Hal are each as defined above, and if Y and Hal are both halogen they are both preferably chlorine or fluorine, with a compound of the formula $H_2N$—B, where B is as defined above.

The condensation reactions according to the invention between an amino-azo compound of the formula (4) and a compound of the formula Hal-W are carried out in the conventional manner of reacting an amino compound with a triazine compound which contains a reactive halogen atom, for instance in an organic or preferably aqueous-organic or aqueous medium in the presence of an acid-binding agent, for example an alkali metal or alkaline earth metal carbonate or bicarbonate or an alkali or alkaline earth metal hydroxide or an alkali metal acetate, the alkali and alkaline earth metals preferably being sodium, potassium and calcium, or a tertiary amine, for example pyridine, triethylamine or quinoline.

If the condensation reactions are carried out in an organic or aqueous-organic medium, the organic solvent (component) is a water-miscible solvent which is inert toward reactive halogen, for example acetone, dioxane or dimethyl-formamide.

These condensation reactions are in general carried out at a temperature between 0° and 100° C. and a pH of between 1 and 8. Preferably, the reaction of the amino compound of the formula (4) with cyanuric chloride takes place at a pH between 3 and 6, in particular between 4 and 5, and at a temperature between 0° and 30° C., in particular between 15° and 20° C. Preferably, the reaction of the amine (4) with cyanuric fluoride takes place at a pH between 3 and 8, in particular between 6 and 8, and at a temperature between 0° and 30° C., in particular between 0 and 10° C. Preferably, the reaction of the amine (4) with a compound of the formula Hal-W where Hal is chlorine and in the radical W X is chlorine and Y is a group of the formula —A—R, takes place at a pH of between 1 and 8, in particular between 6 and 8, and at a temperature of between 0° and 75° C., in particular between 60° and 70° C.

The condensation reactions according to the present invention between a halotriazinylamino-azo compound of the formula (6) and a compound of the formula $H_2N$—B, where B is as defined above, likewise take place in analogy with known procedures for such reactions between halotriazine compounds and hydroxy- or amino-containing compounds at a pH of between 1 and 6, preferably between 3 and 5, and at a temperature between 50° and 100° C., preferably between 50° and 80° C., under the customary conditions mentioned above for the reaction of an amine (4) with a compound Hal-W. Preferably, the reaction of a compound of formula (6) where Hal is as defined above, preferably chlorine, and Y is a group of the formula —A—R with a compound of the formula $H_2N$—B is carried out at a pH between 1 and 6, in particular between 3 and 5, and at a temperature between 50° and 100° C., in particular between 50° and 80° C.

Monoazo compounds of the formula (1) according to the present invention where D is as defined above, Y is chlorine and X is a group of the formula —NH—B or where X is chlorine and Y is a group of the formula —A—R can also be prepared according to the present invention in analogy with the above directions for the reaction of an amine (4) with a compound Hal-W by reacting a compound of the formula (7)

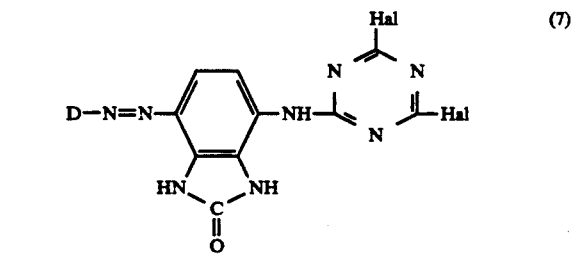

(7)

where D is as defined above and each Hal is chlorine, with a compound of the formula $H_2N$—B, where B is as defined above, or with a compound of the formula H—A—R, where A and R are each as defined above, at a pH of between 1 and 10, preferably between 3 and 9, and at a temperature of between 20° and 100° C., preferably between 35° and 100° C. Preferably the reaction with a compound of the formula $H_2N$—B takes place at a temperature of between 60° and 95° C., in particular between 70 and 90° C., and at a pH of between 3 and 7, in particular between 3 and 5, and the reaction with a compound of the formula H—A—R preferably takes places at a temperature between 20° and 50° C., in particular between 35° and 45° C., and at a pH of between 7 and 10, preferably between 8 and 9. In particular, the reaction with cyanamide or an alkali metal salt thereof (A equal to NH and R equal to cyano) takes place at a temperature between 35° and 45° C. and at a pH of between 8 and 9.

Monoazo compounds of the formula (1) according to the present invention where D is as defined above, Y is fluorine and X is a group of the formula —NH—B or where X is fluorine and Y is a group of formula —A—R can similarly also be prepared by reacting a compound of the formula (7) where D is as defined above and each Hal is fluorine with a compound of the formula $H_2N$—B, where B is as defined above, or with a compound of the formula H—A—R, where A and R are each as defined above, at a pH between 1 and 10, preferably between 7 and 9, and at a temperature between 0° and 40° C., preferably between 5° and 30° C. Preferably, the reaction with a compound of the formula $H_2N$—B takes place at a temperature between 0° and 30° C., in particular between 5° and 20° C., and at a pH between 5 and 10, in particular between 7 and 9, and the reaction with a compound of the formula H—A—R preferably takes place at a temperature between 0° and 40° C., in particular between 20° and 30° C., and a pH of between 6 and 9, preferably between 7.5 and 8.5. In particular, the reaction with cyanamide or an alkali metal salt thereof (A equal to NH and R equal to cyano) takes place at a temperature between 20° and 30° C. and at a pH between 7.5 and 8.5.

The starting aminoazo compounds of the formula (4) can be prepared in a conventional manner by coupling the diazonium compound of the amine of the formula D—$NH_2$ with 4-aminobenzimidazol-2-one. The diazotization and coupling reactions are carried out in analogy with known procedures, for instance the diazotization in general at a temperature between −5° C. and +15° C. and at a pH below 2 by means of a strong acid and an alkali metal nitrite in a preferably aqueous medium and the coupling reaction in general at a temperature between 0° and 30° C. and a pH between 1.5 and 4.5, preferably in an aqueous medium.

The separation and isolation of the azo compounds of the formula (1) prepared according to the present invention from the as-synthesized solutions can be effected by generally known methods, for example by precipitating from the reaction medium by means of an electrolyte, for example sodium chloride or potassium chloride, or by evaporating the reaction solution, for example by spray drying, in which case a buffer substance may added to the as-synthesized solution. If the latter manner of isolation is chosen, it is frequently advisable to separate off any sulfate present in these solutions prior to evaporation by precipitation as calcium sulfate and removal by filtration.

The monoazo compounds of the formula (1) according to the present invention—hereinafter referred to as compounds (1) —have fiber-reactive properties and possess very useful dye properties. They can therefore be used for dyeing (including printing) hydroxy-containing and/or carboxamido-containing fiber materials. Moreover, the solutions obtained in the synthesis of the compounds (1) can be used directly in dyeing as liquid preparations with or without the prior addition of a buffer substance and with or without prior concentrating.

The present invention therefore also provides for the use of the compounds (1) according to the present invention for dyeing (including printing) hydroxy- and-/or carboxamido-containing fiber materials or, to be more precise, processes for the application thereof to said substrates. Methods analogous to known methods can be employed.

Hydroxy-containing materials are those of natural or synthetic origin, for example cellulose fiber materials or regenerated products thereof and polyvinyl alcohols. Cellulose fiber materials are preferably cotton but also include other vegetable fibers, such as linen, hemp, jute and ramie fibers; regenerated cellulose fibers are for example staple viscose and filament viscose.

Carboxamido-containing materials are for example synthetic and natural polyamides and polyolefins in the form of fibers, for example wool and other animal hairs, silk, leather, nylon-6.6, nylon 6, nylon-11 and nylon-4.

The compounds (1), as provided for the use according to the present invention, can be applied to and fixed on the substrates mentioned, by the application of techniques known for water-soluble dyes, in particular fiber-reactive dyes, for example by bringing the compound (1) in dissolved form onto or into the substrate and fixing it thereon or therein by the action of heat or by the action of an alkaline agent or both. Such dyeing and fixing techniques have been repeatedly described not only in the trade literature but also in the patent literature, for example in European Patent Application Publication no. 0 181 585A.

The dyeings obtainable with the compounds (1) according to the present invention have, in particular on cellulose fiber materials, good light fastness properties not only in the dry state of the dyeing but also in the wet state, for example when moistened with a perspiration solution, and also good wet fastness properties, for example wash fastness properties at from 60° to 95° C., even in the presence of perborates, good acid and alkaline milling, cross-dyeing and perspiration fastness properties, a high steam resistance, good alkali, acid, water and seawater fastness properties, also good pleating, hot press and crock fastness properties. Similarly, the dyeings have a high acid fading resistance when moist dyed material still containing acetic acid is stored.

The examples which follow serve to illustrate the invention. Parts and percentages are by weight, unless otherwise stated. Parts by weight bear the same relation to parts by volume as the kilogram to the liter.

The compounds described in these examples by means of the formula are indicated in the form of the free acid; in general they are prepared and isolated in the form of their sodium or potassium salts, and used for dyeing in the form of their salts. Similarly, the starting compounds and components mentioned in the form of the free acid in the subsequent examples, in particular table examples, can be used in the synthesis as such or in the form of their salts, preferably alkali metal salts, such as sodium or potassium salts.

The absorption maxima ($\lambda_{max}$ values) indicated for the visible region were determined on aqueous solutions of the alkali metal salts. In the table examples, the $\lambda_{max}$ values are given in brackets in the hue column; the wavelength unit is nm.

EXAMPLE 1

2-Aminonaphthalene-4,8-disulfonic acid is diazotized at 0° C. in a conventional manner by adding 33 parts of 10N aqueous hydrochloric solution to a mixture consisting of a solution of 30.3 parts of this aminonaphthalene compound in 450 parts of water and 20 parts of 5N aqueous sodium nitrite solution. Excess nitrous acid is destroyed in a conventional manner with little amidosulfuric acid. Then 14.9 parts of 4-aminobenzimidazol-2-one are added, and the coupling reaction is carried out at a pH of from 4 to 5. After the coupling reaction has ended, the precipitate formed is filtered off with suction and suspended in 300 parts of water. To this suspension is added a suspension of 19 parts of trichloro-s-triazine in 100 parts of water, and the reaction is completed at from 5° to 15° C. and a pH of between 6 and 7. Then 4.2 parts of cyanamide are added, and the second condensation reaction is carried out at a pH between 8 and 9.5 and at a temperature of between 35° and 45° C. The third condensation reaction takes place following the addition of 24.9 parts of 3-(β-sulfatoethylsulfonyl)aniline at a pH of between 3.5 and 4.5 and at a temperature of between 70° and 90° C.

The resulting azo compound according to the present invention is salted out from the synthesis solution with potassium chloride and isolated as an alkali metal salt (preferably potassium salt). It has, written in the form of the free acid, the formula

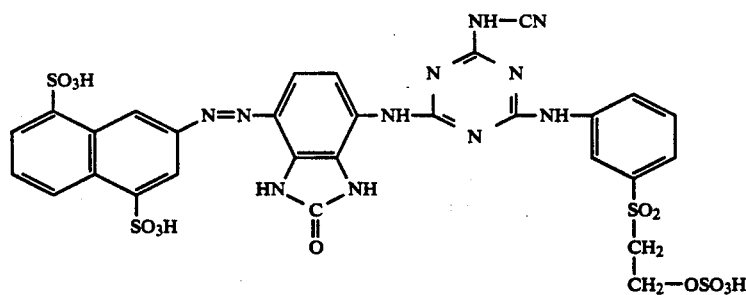

($\lambda_{max} = 377$ nm)

and shows very good fiber-reactive dye properties. Applied by the application and fixing methods known for fiber-reactive dyes to the materials mentioned in the description, in particular cellulose fiber materials, for example cotton, the azo compound according to the present invention produces strong yellow dyeings and prints having good fastness properties, of which in particular the good light and perspiration fastness properties may be singled out.

EXAMPLE 2

38.3 parts of 2-aminonaphthalene-3,6,8-trisulfonic acid are diazotized in the conventional manner in a neutral aqueous solution (400 parts of water) at 0° C. for one hour by addition of 20 parts of aqueous 5N sodium nitrite solution and 33 parts of aqueous 10N hydrochloric acid solution. 14.9 parts of 4-aminobenzimidazol-2-one are then added, a pH between 6 and 7 is gradually set with 20% strength aqueous sodium carbonate solution, the batch is subsequently stirred for a further hour and then adjusted to a pH of between 2 and 3 by means of dilute aqueous hydrochloric acid solution, and the azo compound prepared is isolated by salting out with potassium chloride and filtration. The isolated product is dissolved in 700 parts of water. A pH between 3 and 5 is set with 20% strength aqueous sodium carbonate solution, and after addition of 40 parts of 2-chloro-4-cyanamido-6-[4'-(β-sulfatoethylsulfonyl)-phenylamino]-1,3,5-triazine the condensation reaction takes place at a temperature between 60° and 80° C. and a pH between 3 and 5.

After the reaction has ended, the batch is cooled down to 20° C., the pH is adjusted to 4 to 6, and the azo compound according to the present invention is salted out with potassium chloride and isolated as alkali metal salt (predominantly potassium salt). Written in the form of the free acid it has the formula

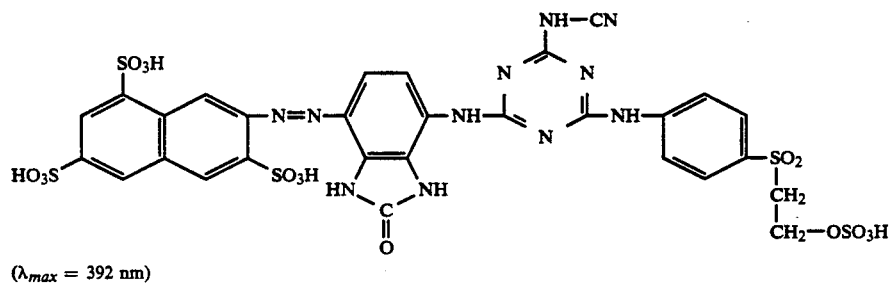

($\lambda_{max} = 392$ nm)

and shows very good fiber-reactive dye properties and, applied by the application and fixing methods customary for fiber-reactive dyes, produces on the materials mentioned in the description, in particular on cotton, strong, brilliant, golden yellow dyeings and prints having good fastness properties.

EXAMPLE 3

To prepare an azo compound according to the present invention, first the azo compound from 2-aminonaphthalene-3,6,8-trisulfonic acid as diazo component and 4-aminobenzimidazol-2-one as coupling component is prepared in accordance with the directions of example 2. The isolated product is dissolved in 700 parts of water. A pH between 6 and 7 is set with 20% strength aqueous sodium carbonate solution. Following the addition of 19 parts of 2,4-dichloro-6-cyanamido-1,3,5-triazine the condensation reaction takes place at a temperature between 50° and 70° C. and a pH between 6 and 7. After the reaction has ended, the second condensation reaction is carried out with 24.9 parts of 3-(β-sulfatoethylsulfonyl)aniline at a pH between 3.5 and 4.5 and at a temperature of between 70° and 90° C., and the azo compound according to the present invention is salted out with potassium chloride and isolated as alkali metal salt (potassium salt).

The azo compound according to the present invention, written in the form of the free acid, has the formula Then 27 parts of γ-(β'-sulfatoethylsulfonyl)propylamine are added, the batch is slowly warmed to 20° C. while a pH between 6 and 8 is maintained, the batch is subsequently stirred for from 5 to 10 hours, and the azo compound according to the present invention is isolated by evaporating the reaction solution.

This gives the azo compound according to the present invention of the formula (written in the form of the free acid)

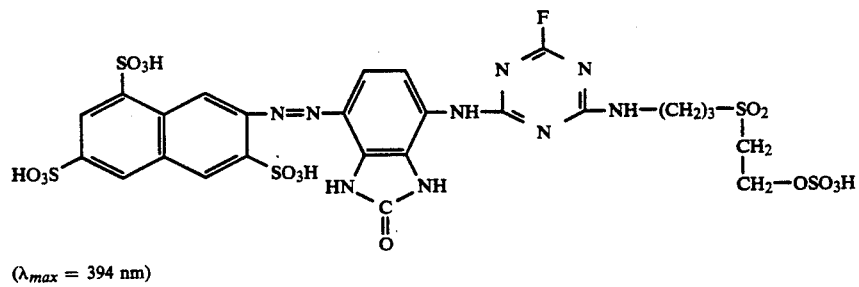

(λ_max = 394 nm)

in the form of the sodium salt, which dyes the materials mentioned in the description, in particular cotton, in strong, brilliant golden yellow shades having very good fastness properties.

EXAMPLE 5

Example 1 is repeated to diazotize 30.3 parts of 2-aminonaphthalene-4,8-disulfonic acid, and after 14.9 parts of 4-aminobenzimidazol-2-one have been added, the coupling reaction is carried out at a weakly acid pH. The precipitate formed is filtered off with suction and suspended in 300 parts of water. 19 parts of trichlorotriazine in aqueous dispersion are added at from 5° to 15° C., and the condensation reaction is carried out at that temperature and a pH between 6 and 7. The batch is similarly admixed with 24.9 parts of 3-(β-sulfatoethylsulfonyl)aniline, and the second condensation reaction is carried out a pH of between 3 and 5.5 at a temperature of between 50° and 80° C. for about 15 hours.

Thereafter the azo compound according to the present invention is salted out with sodium chloride and isolated as alkali metal salt (sodium salt). Written in the form of the free acid it has the formula

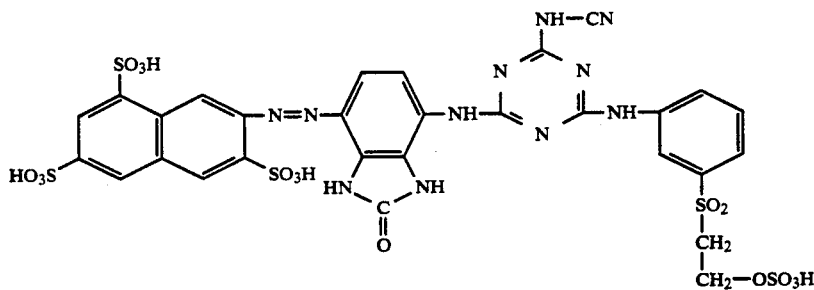

(λ_max = 390 nm)

possesses very good fiber-reactive dye properties and applied by the application methods customary for fiber-reactive dyes to the materials mentioned in the description, in particular cotton, produces strong yellow dyeings and prints having good fastness properties, of which in particular the good light and perspiration light fastness properties may be singled out.

EXAMPLE 4

Example 2 is followed to dissolve the amino-azo compound prepared there in 700 parts of water as a first stage. After a pH has been set between 6 and 8 with dilute aqueous sodium hydroxide solution, 18 parts of trifluorotriazine are added at from 0° to 10° C., and the batch is subsequently stirred at that temperature at a pH of from 6 to 8 for approximately a further 20 minutes.

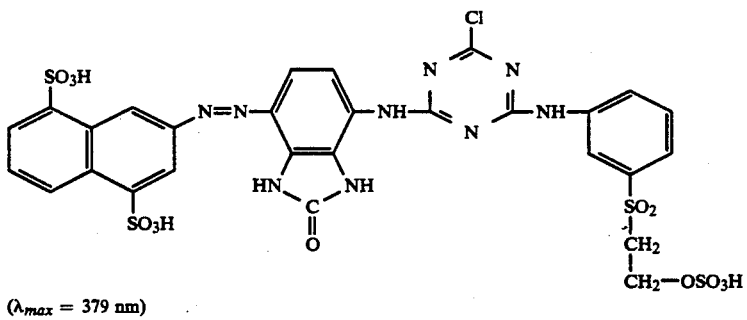

($\lambda_{max}$ = 379 nm)

and dyes for example cotton in brilliant, golden yellow shades having good fastness properties.

EXAMPLE 6 to 55

The table examples which follow describe further monoazo The compounds according to the present invention conforming to the formula (1) in terms of the symbols of the formula (1). They can be prepared in a manner according to the present invention, for example analogously to Example 1. They likewise have very good dye properties and produce on the materials mentioned in the description, in particular cellulose fiber materials, strong dyeings and prints having good fastness properties in the hue indicated for the particular table example (here on cotton).

| | Azo compound of formula (1) | | | |
|---|---|---|---|---|
| Example | Radical D | Radical X | Radical Y | Hue |
| 6 | 4,8-Disulfonaphth-2-yl | 6-(β-Sulfatoethylsulfonyl)-naphth-2-ylamino | Chloro | golden yellow (376) |
| 7 | " | 4-(β-Sulfatoethylsulfonyl)-phenylamino | Fluoro | golden yellow (375) |
| 8 | " | 3-(β-Sulfatoethylsulfonyl)-phenylamino | Fluoro | golden yellow (381) |
| 9 | " | 4-(β-Sulfatoethylsulfonyl)-phenylamino | Cyanamido | golden yellow (378) |
| 10 | " | γ-(β'-Sulfatoethylsulfonyl)-propylamino | Cyanamido | golden yellow (377) |
| 11 | 3,6,8-Trisulfonaphth-2-yl | 4-(β-Sulfatoethylsulfonyl)-phenylamino | Chloro | golden yellow (395) |
| 12 | " | 3-(β-Sulfatoethylsulfonyl)-phenylamino | Chloro | golden yellow (394) |
| 13 | " | γ-(β'-Sulfatoethylsulfonyl)-propylamino | Chloro | golden yellow (389) |
| 14 | " | 4-(β-Sulfatoethylsulfonyl)-phenylamino | Fluoro | golden yellow (393) |
| 15 | " | 3-(β-Sulfatoethylsulfonyl)-phenylamino | Fluoro | golden yellow (394) |
| 16 | " | 4-(β-Sulfatoethylsulfonyl)-phenylamino | Cyanamido | golden yellow (392) |
| 17 | " | 3-(β-Sulfatoethylsulfonyl)-phenylamino | Cyanamido | golden yellow (390) |
| 18 | " | γ-(β'-Sulfatoethylsulfonyl)-propylamino | Cyanamido | golden yellow (393) |
| 19 | " | 6-(β-Sulfatoethylsulfonyl)-naphth-2-ylamino | Cyanamido | golden yellow (392) |
| 20 | " | 6-(β-Sulfatoethylsulfonyl)-8-sulfonaphth-2-ylamino | Cyanamido | golden yellow (395) |
| 21 | 2,4-Disulfophenyl | 4-(β-Sulfatoethylsulfonyl)-phenylamino | Chloro | golden yellow (381) |
| 22 | " | 3-(β-Sulfatoethylsulfonyl)-phenylamino | Chloro | golden yellow (383) |
| 23 | " | γ-(β'-Sulfatoethylsulfonyl)-propylamino | Chloro | golden yellow (376) |
| 24 | " | 4-(β-Sulfatoethylsulfonyl)-phenylamino | Fluoro | golden yellow (378) |
| 25 | " | 3-(β-Sulfatoethylsulfonyl)-phenylamino | Fluoro | golden yellow (377) |
| 26 | " | 4-(β-Sulfatoethylsulfonyl)-phenylamino | Cyanamido | golden yellow (376) |
| 27 | " | 3-(β-Sulfatoethylsulfonyl)-phenylamino | Cyanamido | golden yellow (379) |
| 28 | " | γ-(β'-Sulfatoethylsulfonyl)-propylamino | Cyanamido | golden yellow (378) |
| 29 | 2,5-Disulfophenyl | 4-(β-Sulfatoethylsulfonyl)-phenylamino | Chloro | golden yellow (382) |
| 30 | " | 3-(β-Sulfatoethylsulfonyl)-phenylamino | Chloro | golden yellow (378) |
| 31 | " | 4-(β-Sulfatoethylsulfonyl)-phenylamino | Fluoro | golden yellow (377) |

-continued

| | Azo compound of formula (1) | | | |
|---|---|---|---|---|
| Example | Radical D | Radical X | Radical Y | Hue |
| 32 | " | 3-(β-Sulfatoethylsulfonyl)-phenylamino | Fluoro | golden yellow (375) |
| 33 | " | 4-(β-Sulfatoethylsulfonyl)-phenylamino | Cyanamido | golden yellow (376) |
| 34 | " | 3-(β-Sulfatoethylsulfonyl)-phenylamino | Cyanamido | golden yellow (378) |
| 35 | " | γ-(β'-Sulfatoethylsulfonyl)-propylamino | Cyanamido | golden yellow (381) |
| 36 | " | 6-(β-Sulfatoethylsulfonyl)-naphth-2-ylamino | Cyanamido | golden yellow (380) |
| 37 | " | 6-(β-Sulfatoethylsulfonyl)-8-sulfonaphth-2-ylamino | Cyanamido | golden yellow (381) |
| 38 | 4,8-Disulfonaphth-2-yl | 4-(β-Sulfatoethylsulfonyl)-phenylamino | Chloro | golden yellow (379) |
| 39 | " | 3-(β-Sulfatoethylsulfonyl)-phenylamino | Chloro | golden yellow (379) |
| 40 | " | γ-(β'-Sulfatoethylsulfonyl)-propylamino | Chloro | golden yellow (375) |
| 41 | " | 6-(β-Sulfatoethylsulfonyl)-8-sulfonaphth-2-ylamino | Chloro | golden yellow (377) |
| 42 | 4-Chloro-3-methyl-6-sulfophenyl | 3-(β-Sulfatoethylsulfonyl)-phenylamino | Chloro | golden yellow (380) |
| 43 | 3,6,8-Trisulfonaphth-2-yl | 4-(β-Sulfatoethylsulfonyl)-phenylamino | Methoxy | golden yellow (390) |
| 44 | " | γ-(β'-Sulfatoethylsulfonyl)-propylamino | Methoxy | golden yellow (392) |
| 45 | 4,8-Disulfonaphth-2-yl | 3-(β-Sulfatoethylsulfonyl)-phenylamino | Methoxy | golden yellow (378) |
| 46 | " | 3-(β-Sulfatoethylsulfonyl)-phenylamino | β-Sulfoethyl-amino | golden yellow (380) |
| 47 | " | 4-(β-Sulfatoethylsulfonyl)-phenylamino | β-Sulfoethyl-amino | golden yellow (381) |
| 48 | 3,6,8-Trisulfonaphth-2-yl | 4-(β-Sulfatoethylsulfonyl)-phenylamino | Morpholino | golden yellow (393) |
| 49 | 4,8-Disulfonaphth-2-yl | 4-(β-Sulfatoethylsulfonyl)-phenylamino | Morpholino | golden yellow (380) |
| 50 | " | 3-(β-Sulfatoethylsulfonyl)-phenylamino | Morpholino | golden yellow (378) |
| 51 | " | β-[β'-(Vinylsulfonyl)-ethoxy]-ethylamino | Chloro | golden yellow (382) |
| 52 | ' | β-[β'-(Vinylsulfonyl)-ethoxy]-ethylamino | Fluoro | golden yellow (379) |
| 53 | 2,2'-Disulfo-4'-nitrostilben-4-yl | 4-(β-Sulfatoethylsulfonyl)-phenylamino | Chloro | golden yellow (384) |
| 54 | 2,2'-Disulfo-4'-nitrostilben-4-yl | 3-(β-Sulfatoethylsulfonyl)-phenylamino | Chloro | golden yellow (383) |
| 55 | 4-Chloro-3-methyl-6-sulfophenyl | 4-(β-Sulfatoethylsulfonyl)-phenylamino | Chloro | golden yellow (382) |

What is claimed is:
1. A water-soluble azo compound of the formula

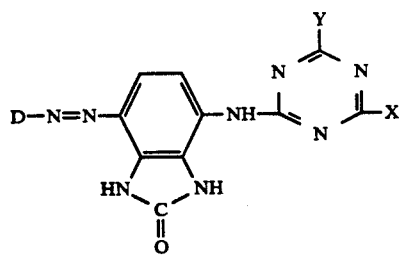

where
D is phenyl substituted by one, two or three substituents selected from the group consisting of chlorine, bromine, fluorine, sulfo, carboxy, alkyl of 1 to 4 carbon atoms, alkoxy of 1 to 4 carbon atoms, trifluoromethyl, notri, styryl unsubstituted or substituted by nitro or nitro and sulfo, benzothiazol-2-yl unsubstituted or substituted by methyl, methoxy, sulfo or methyl and sulfo, sulfamoyl, carbamoyl and alkyllsulfonyl of 1 to 4 carbon atoms, at least one of these substituents being a water-solubilizing group selected from sulfo and carboxy, or at least one of these substituents being substituted by a water-solubilizing group selected from sulfo and carboxy, or D is naphthyl substituted by one, two or three sulfo groups;

Y is fluorine, chlorine or a group of the formula

—A—R where
A is oxygen or the group NH, and
R is hydrogen, alkyl of from 1 to 10 carbon atoms, or cycloalkyl of from 5 to 8 carbon atoms, or alkyl of from 2 to 8 carbon atoms which is interrupted by one or two hetero groups selected from group consisting of —O—, —NH—, —N(CH₃)—, —SO₂— and —CO—, or is benzyl, sulfomethyl, β-sulfoethyl or cyano;

X is fluorine, chlorine or an amino group conforming to the formula —NH—B, where
B is a group of the formula —alk—SO₂—Z

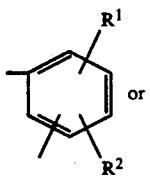 or

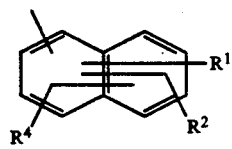

where alk is branched or straight-chain alkylene of from 1 to 4 carbon atoms, or alkylene of from 2 to 8 carbon atoms which is interrupted by one or two hetero groups selected from the consisting of —O—, —NH—, —N(CH$_3$)— and —SO$_2$—, Z is vinyl or an ethyl substituted in the β-position by a substituent which is eliminable by means of alkali to form the vinyl group, in which said substituent is selected from the group consisting of halogen, alkanoyloxy of 2 to 5 carbon atoms, sulfobenzoyloxy, benzoyloxy, phenylsulfonyloxy, toluylsulfonyloxy, phosphato, sulfato, thiosulfato and dialkylamino with alkyls each of 1 to 4 carbon atoms, R$^1$ is hydrogen, carboxy, sulfo or a group of the formula —SO$_2$—Z, where Z is as defined above, R$^2$ is hydrogen, alkyl of from 1 to 4 carbon atoms, alkoxy of from 1 to 4 carbon atoms, chlorine, bromine, carboxy, sulfo or nitro, R$^3$ is hydrogen, alkyl of from 1 to 4 carbon atoms, alkoxy of from 1 to 4 carbon atoms, chlorine or bromine and R$^4$ is hydrogen, sulfo or carboxy.

2. A compound as claimed in claim 1, wherein D is 2,4-disulfophenyl, 2,5-disulfophenyl, 4,8-disulfonaphth-2-yl, 3,6,8-trisulfonaphth-2-yl, 2,2'-disulfo-4'-nitrostilben-4-yl or 4-chloro-3-methyl-6-sulfophenyl.

3. A compound as claimed in claim 1, wherein alk is n-propylene.

4. A compound as claimed in claim 1, wherein R$^2$ is hydrogen or sulfo.

5. A compound as claimed in claim 1, wherein R$^3$ is hydrogen.

6. A compound as claimed in claim 1, wherein Z is β-sulfatoethyl.

7. A compound as claimed in claim 2, wherein alk is n-propylene.

8. A compound as claimed in claim 2, wherein R$^2$ is hydrogen or sulfo.

9. A compound as claimed in claim 2, wherein R$^3$ is hydrogen.

10. A compound as claimed in claim 2, wherein Z is β-sulfatoethyl.

11. A compound as claimed in claim 3, wherein Z is β-sulfatoethyl.

12. A compound as claimed in claim 4, wherein Z is β-sulfatoethyl.

13. A compound as claimed in claim 5, wherein Z is β-sulfatoethyl.

14. A compound as claimed in claim 1, wherein R is cyano.

15. The water-soluble azo compound as claimed in claim 1, wherein R$^2$ is a ethyl, methyl, methoxy, ethoxy, chlorine, bromine, carboxy, sulfo or nitro.

16. The water-soluble azo compound as claimed in claim 1, wherein A is the group NH.

17. The water-soluble azo compound as claimed in claim 1, wherein Y is chlorine or cyanamido.

18. The water-soluble azo compound as claimed in claim 1, wherein X is chlorine.

* * * * *